United States Patent [19]

Jolly

[11] Patent Number: 4,568,512
[45] Date of Patent: Feb. 4, 1986

[54] BRACING GRIDS FOR NUCLEAR REACTOR FUEL SUB-ASSEMBLIES

[75] Inventor: Robert Jolly, Freckleton, Nr. Preston, England

[73] Assignee: United Kingdom Atomic Energy Authority, London, England

[21] Appl. No.: 456,710

[22] Filed: Jan. 10, 1983

[30] Foreign Application Priority Data

Jan. 20, 1982 [GB] United Kingdom ............... 8201577

[51] Int. Cl.⁴ .............................................. G21C 3/34
[52] U.S. Cl. .................................... 376/442; 376/438
[58] Field of Search ............... 376/442, 438; 248/68.1

[56] References Cited

U.S. PATENT DOCUMENTS 4,181,571 1/1980 Jolly .................................... 376/442

Primary Examiner—Donald P. Walsh
Attorney, Agent, or Firm—William R. Hinds

[57] ABSTRACT

A bracing grid (27) made from joggled strip (20) and which is one of a number of similar grids supporting fuel pins (26) in a fuel sub-assembly for a nuclear reactor is characterized in having the peripheries of the grids completed by unit edge cells (21). Where the periphery of the grids accommodate sub-assembly corner posts (30) the continuity of the unit edge cells is maintained around the corner posts.

6 Claims, 4 Drawing Figures

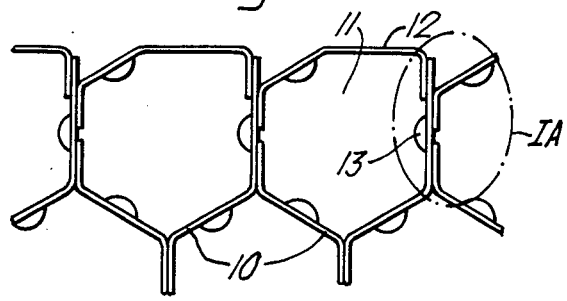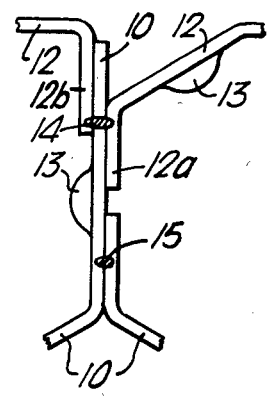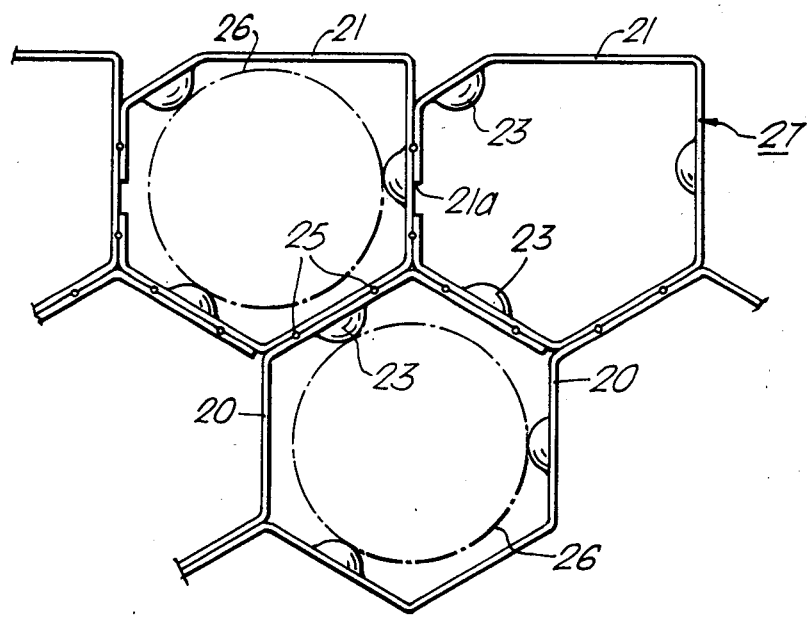

BRACING GRIDS FOR NUCLEAR REACTOR FUEL SUB-ASSEMBLIES

This invention relates to bracing grids for fuel pins in nuclear reactor fuel sub-assemblies and is concerned with such grids for highly rated fuel pins as used in fast reactors.

BACKGROUND OF THE INVENTION

The use and development of bracing grids in fuel subassemblies goes back over a long period. For example GP-PS No. 1,052,777 shows a grid having dimpled circular tubes to define unit cells to locate fuel pins and also has other non-circular un-dimpled tubes mating with the circular tubes to space them apart. This is a complicated structure, it has low compliance, it requires a multiplicity of tube sections and it is time consuming and costly to fabricate. In any event the pin locating unit cells are not closely spaced, and cannot be closely spaced, as required by the high rating of fast reactors.

In a further prior art disclosure, namely GB-PS No. 1,386,424 the concept of a "joggled" strip grid is introduced. The strip, in the course of its length, defines the dimpled walls of many cells but never itself defines a complete unit cell. Each cell in the grid is defined by a second level of joggled strips which cooperate with those in the first level. This introduces complexity and problems of matching two sets of strips at different levels with the dimples correctly placed and each set of strips introduced entry and exit power losses in the flow of coolant through the grids.

A single level, dimpled, joggled strip form of grid has however been used in which the cells in the grid are defined by strip material confined to a single level. There has been no known publication of this grid and accordingly it is described below with reference to the drawings. As described, the grid has edge cells which are formed in part by the joggled strips and in part by shaped supplementary strips. This grid has an inherent mechanical weakness and constructional problems which the present invention seeks to overcome whilst still retaining the advantages which are inherent with joggled strip.

FEATURES AND ASPECTS OF THE INVENTION

To this end the present invention provides a nuclear reactor fuel sub-assembly comprising a bundle of spaced fuel pins within a tubular wrapper having a series of bracing grids each formed with dimpled joggled strip at a single level disposed at intervals along the sub-assembly characterised in that the peripheries of the grids are completed by unit edge cells.

DESCRIPTION OF THE DRAWINGS

The invention will now be described further with reference to the accompanying drawings in which:

FIG. 1 shows in plan view a fragment of a single level, dimpled, joggled strip grid as already used, with FIG. 1A providing a magnified view of a part of the grid;

FIG. 2 shows in plan view a fragment of a single level, dimpled, joggled strip grid for use in a sub-assembly according to the invention.

DESCRIPTION OF THE PREFERRED EMBODIMENT

Figure 3:
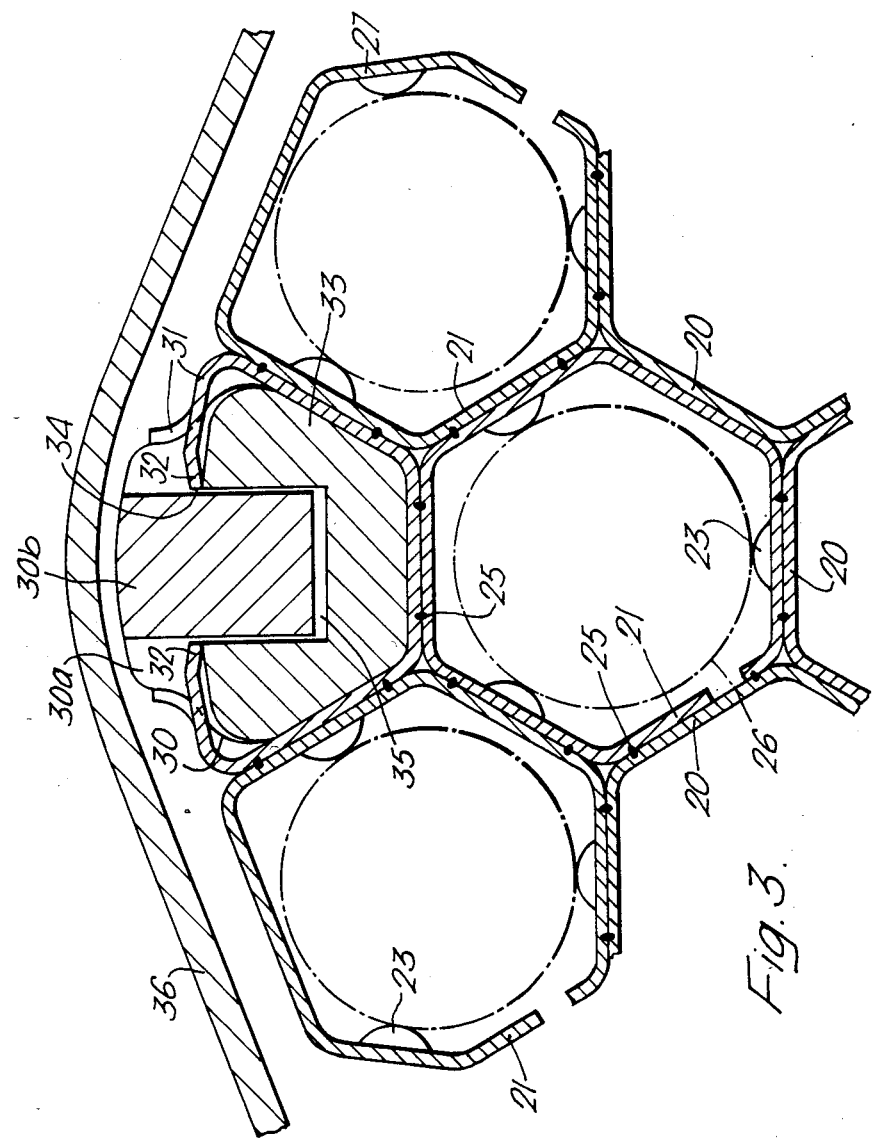
FIG. 3 shows the grid of FIG. 2 at a corner post of the sub-assembly.

In FIG. 1 and 1A a series of dimpled joggle strips 10 are shown assembled together to form the main construction of a compliant bracing grid. The edge cells 11 of the grids each have six walls. For any edge cell, four of the walls are formed by the ends of joggled strips 10 and two are formed by a shaped supplementary strip 12 having ends 12a and 12b which lie alongside the ends of a strip 10. As seen clearly in FIG. 1A this construction gives rise to a spot weld 14 which has to penetrate and join together three thickness of metal and, in the case of end 12b, the weld is made very near the extremity in order to accommodate a fuel pin locating dimple 13. This is an inherently weak joint and not easy to inspect. A faulty joint can create one or other of two very costly situations. If the faulty weld is discovered before the grid is used the whole grid is waste. If the faulty weld is discovered in use then a complete fuel assembly has to be discharged from a reactor. The weld strength of the edge cell is derived from two "triple-layer" welds 14 and two "double-layer" welds 15.

The axial strength of the grid is also weakened by the form of weld 14 shown when compared with welds like weld 15 which exist elsewhere in the grid. The grids are subjected to substantial doming forces by axial coolant flow and by thermal dimension changes in fuel pins in frictional contact with the dimples of the grid. For a dome to be strong it is essential that its base perimeter is strong. The supplementary strip 12 and welds 14 do not provide such strength.

In FIG. 2 a grid 27 is shown having dimpled joggled strip 20 completed at its periphery by unit cells 21. It is seen that the weld strength of each cell 21 is derived from eight "double-layer" welds 25 and "triple-layer" welds are avoided altogether. In addition the cells 21 are much stronger than supplementary strips 12 of FIG. 1. The cells of the grids have dimples 23 to centralise fuel pins 26 in the cells. The dimples are of elongate diamond shape and disposed with their longitudinal axes parallel with the axes of the cells so that turbulance and pressure drop through the cells are minimised. This shape also reduces metal thinning when forming the dimples as metal pulled from the strip to form the dimples is drawn from a greater area. Typically there could be 325 fuel pins 26 located by the grid.

FIG. 3 shows the construction of the grid at the corner posts 30.

At the length of the post 30 occupied by the grid shown, the post 30 is cut away at 30a to leave only a rectangular section part 30b. Each grid has six clip parts 31 to clip the grid to the cut aways 30a of six posts 30. The clip parts 31 have flaps 32 which can be deflected into cut aways 30a to locate the grids on the posts 30. The clip parts 31 are filled with a bolster 33 which is edge welded to the flaps 32 at 34. The bolster 33 forms a small clearance 35 with the part 30b. This gives a small degree of freedom in the whole assembly.

An approximately hexagonal tubular wrapper 36 is shown.

It is seen that the unit cells 21 exist all round the periphery of the grid, even at the posts 30, and hence the continuity of the strength giving edge cells is maintained.

The cells 21 could be of unjoined section but it is convenient to form them with a small opening 21a using the same stock material as is used for the joggled strips 20.

Another merit may arise from the invention when the grid of FIG. 2 is compared with that of FIG. 1. The FIG. 1 grid requires a greater variety of joggled strips as in FIG. 1 some of the strips terminate at "long" ends and others at "short" ends and they are not reversible. The FIG. 2 grid on the other hand uses about 40% less varieties of joggled strip.

I claim:

1. A nuclear reactor fuel sub-assembly comprising a bundle of fuel pins within a tubular wrapper, and a series of bracing grids locating the fuel pins in transversely spaced relation with respect to one another, each bracing grid comprising an array of fuel pin-receiving cells forming a central core of cells surrounded by edge cells, the central core cells being defined by a plurality of joggled strips each shaped to define part only of each of a plurality of the core cells, and the edge cells each being a unitary cell defined exclusively by a respective length of bent strip and being directly secured to the edge cells on either side thereof and secured to adjacent core cells whereby the peripheral regions of the grids are accorded added axial strength by said unitary edge cells.

2. A sub-assembly as claimed in claim 1 in which the unitary edge cells (21) of the grid are each formed with a small opening (21a) in one wall and are of the same stock material as the joggled strips, the joggled strips ends each laying alongside two walls of two adjacent unitary edge cells (21) which walls are not said one walls.

3. A sub-assembly as claimed in claim 1 having corner posts (30) with cut away parts (30a) into which clip parts (31) integrated with the grids (27) engage.

4. A sub-assembly as claimed in claim 3 in which the clip parts each contain a bolster (33) which is a small clearance fit on the corner posts (30).

5. A sub-assembly as claimed in claim 1 in which the joggled strips are formed with dimples, which dimples (23) are of elongate diamond shape and disposed with their axes parallel with the axes of the cells.

6. A sub-assembly as claimed in claim 1 in which the joggled strips each terminate at their ends in portions which are secured to inwardly facing walls of the edge cells such that the terminal end of each joggled strip is linked to an adjacent joggled strip through the agency of a common edge cell.

* * * * *